United States Patent
Tanei (10) Patent No.: US 7,444,983 B2
(45) Date of Patent: Nov. 4, 2008

(54) CONTROL DEVICE AND CONTROL METHOD FOR AIR AMOUNT REGULATING MECHANISM

(75) Inventor: Katsutoshi Tanei, Aichi-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/639,239

(22) Filed: Dec. 15, 2006

(65) Prior Publication Data

US 2007/0149353 A1   Jun. 28, 2007

(30) Foreign Application Priority Data

Dec. 27, 2005   (JP)   ............... 2005-375739

(51) Int. Cl.
  *F02D 11/10*   (2006.01)
  *F02D 11/00*   (2006.01)
(52) U.S. Cl. ...................... 123/399; 123/403
(58) Field of Classification Search .......... 123/399, 123/319, 402, 403, 405; 477/107, 110, 904, 477/905, 902; 701/54
See application file for complete search history.

(56) References Cited

U.S. PATENT DOCUMENTS

| | | | | |
|---|---|---|---|---|
| 5,002,028 A | * | 3/1991 | Arai et al. ............. | 123/339.19 |
| 6,450,145 B2 | * | 9/2002 | Machida et al. ......... | 123/396 |
| 6,843,227 B2 | * | 1/2005 | Han ...................... | 123/396 |
| 7,052,434 B2 | * | 5/2006 | Makino et al. .......... | 477/107 |
| 2004/0112335 A1 | * | 6/2004 | Makino et al. .......... | 123/399 |
| 2006/0068974 A1 | * | 3/2006 | Bauerle et al. ......... | 477/107 |

FOREIGN PATENT DOCUMENTS

| | | |
|---|---|---|
| JP | A 10-9012 | 1/1998 |
| JP | A 2003-214219 | 7/2003 |
| JP | A 2004-124857 | 4/2004 |
| JP | A 2004-257353 | 9/2004 |

* cited by examiner

*Primary Examiner*—Mahmoud Gimie
(74) *Attorney, Agent, or Firm*—Oliff & Berridge, PLC

(57) ABSTRACT

An ECU executes a program including the steps of calculating a correction coefficient K (1) having a value that is greater as an accelerator pedal position is greater, calculating a first throttle position (1) as a product of a reference value BSE (1) and the correction coefficient K (1), calculating a correction coefficient K (2) having a value that is greater as the accelerator pedal position is greater, and calculating a second throttle position (2) as a product of a reference value BSE (2) and the correction coefficient K (2). If the throttle position is equal to or higher than the first throttle position (1), a target position lower than a provisional target position set in accordance with the accelerator pedal position is set. If the throttle position is set to the second throttle position (2), the throttle position is maintained at the second throttle position (2).

15 Claims, 6 Drawing Sheets

CONTROL DEVICE AND CONTROL METHOD FOR AIR AMOUNT REGULATING MECHANISM

This nonprovisional application is based on Japanese Patent Application No. 2005-375739 filed with the Japan Patent Office on Dec. 27, 2005, the entire contents of which are hereby incorporated by reference.

1. Field Of The Invention

The present invention relates to a control device and a control method for an air amount regulating mechanism, and more particularly to a control device and a control method for an air amount regulating mechanism regulating an amount of air suctioned in an internal combustion engine in accordance with an actuated amount.

2. Description Of The Background Art

Conventionally, an amount of air suctioned in an internal combustion engine has been regulated by varying an actuated amount (throttle position) of a throttle valve (air amount regulating mechanism) and the like. In recent years, an electronic throttle valve mechanically separated from an accelerator pedal as it is driven by a motor is also available. Such an electronic throttle valve is also controlled such that its throttle position is set in accordance with an accelerator pedal position. If the throttle position is determined based on the accelerator pedal position, an amount of air suctioned in the internal combustion engine becomes more than necessary, and drivability may deteriorate. For example, if a state where output shaft revolution of the internal combustion engine is lower than output shaft revolution of the fluid coupling (driven state) makes transition to a state where the output shaft revolution of the internal combustion engine is higher than the output shaft revolution of the fluid coupling (drive state) in a vehicle in which an internal combustion engine is coupled to a transmission with a fluid coupling such as a torque converter being interposed, a direction of transmission of the torque in a powertrain is reversed. Here, if the amount of air suctioned in the internal combustion engine is large and the output is great, shock at the time of transition from the driven state to the drive state is great, which results in poorer drivability. To address this problem, a technique to make an actual throttle position lower than a throttle position determined in accordance with the accelerator pedal position when the direction of transmission of the torque is reversed, by utilizing such a characteristic of the electronic throttle valve that it can be controlled without being constrained by an operation of the accelerator pedal by a driver, is available.

Japanese Patent Laying-Open No. 2004-124857 discloses a throttle position control device of an internal combustion engine gradually varying the throttle position at a prescribed gradual-change rate in varying the throttle position of the internal combustion engine mounted on a vehicle to a target position set based on the accelerator pedal position. The throttle position control device includes a rate setting unit lowering the gradual-change rate for a prescribed period such that rate of change in the speed of an engine output shaft, that changes together with variation in the throttle position, is smaller during a period in which the direction of torque transmitted between a vehicle drive system and the internal combustion engine is reversed. The gradual-change rate is lowered when deviation between the actual throttle position and a predetermined throttle position is equal to or lower than a prescribed value.

According to the throttle position control device described in this publication, the rate of change in the speed of the engine output shaft is suppressed. Therefore, shock that occurs when the direction of torque transmitted between the vehicle drive system and the internal combustion engine is reversed is suppressed as much as possible, so that deterioration in drivability can be suppressed.

In Japanese Patent Laying-Open No. 2004-124857, however, as the throttle position gradual-change rate is lowered, an output satisfying the driver's request for acceleration may not be obtained, although the shock is suppressed.

SUMMARY OF THE INVENTION

An object of the present invention is to provide a control device and the like of an air amount regulating mechanism capable of achieving both of shock suppression and acceleration performance.

A control device of an air amount regulating mechanism according to one aspect of the present invention is a control device of an air amount regulating mechanism regulating an amount of air suctioned in an internal combustion engine so that the amount of air is greater as an actuated amount is greater. The control device includes an operation unit. The operation unit sets a first actuated amount of the air amount regulating mechanism based on an accelerator pedal position, sets a second actuated amount smaller than the first actuated amount, controls the air amount regulating mechanism such that the actuated amount of the air amount regulating mechanism attains the first actuated amount, controls the air amount regulating mechanism, in a region where the first actuated amount is greater than a threshold value, such that the actuated amount of the air amount regulating mechanism attains the second actuated amount, and changes the threshold value based on the accelerator pedal position.

According to the present invention, the first actuated amount of the air amount regulating mechanism is set based on the accelerator pedal position, so that the actuated amount of the air amount regulating mechanism regulating the amount of air suctioned in the internal combustion engine is set to the first actuated amount. In the region where the first actuated amount is greater than the threshold value, the air amount regulating mechanism is controlled such that the second actuated amount smaller than the first actuated amount is set. The threshold value is changed in accordance with the accelerator pedal position. For example, the threshold value is changed to a value that is smaller as the accelerator pedal position is smaller. Thus, when the accelerator pedal position is small and it is not considered that the driver requests great acceleration, the actuated amount of the air amount regulating mechanism, that is, an intake air amount, is suppressed at an early stage, thereby suppressing the output of the internal combustion engine. Accordingly, relation in magnitude between the output shaft revolution of the internal combustion engine and the output shaft revolution of the fluid coupling connected to the internal combustion engine is reversed, and shock that could occur when the direction of transmission of the torque is reversed can be suppressed. On the other hand, for example, the threshold value is changed to a value that is greater as the accelerator pedal position is greater. Thus, if the accelerator pedal position is great and it is considered that the driver requests great acceleration, the actuated amount of the air amount regulating mechanism, that is, an intake air amount, is suppressed at a late stage, thereby making smaller a degree of suppression of the output of the internal combustion engine. Accordingly, acceleration performance can be ensured. Consequently, a control device of an air amount regulating mechanism capable of achieving both of shock suppression and acceleration performance can be provided.

Preferably, the operation unit changes the threshold value to a value that is smaller as the accelerator pedal position is smaller.

According to the present invention, the threshold value is changed to a value that is smaller as the accelerator pedal position is smaller. Thus, when the accelerator pedal position is small and it is not considered that the driver requests great acceleration, the actuated amount of the air amount regulating mechanism, that is, an intake air amount, is suppressed at an early stage, thereby suppressing the output of the internal combustion engine. Accordingly, relation in magnitude between the output shaft revolution of the internal combustion engine and the output shaft revolution of the fluid coupling connected to the internal combustion engine is reversed, and shock that could occur when the direction of transmission of the torque is reversed can be suppressed.

Further preferably, the operation unit changes the threshold value to a value that is greater as the accelerator pedal position is greater.

According to the present invention, the threshold value is changed to a value that is greater as the accelerator pedal position is greater. Thus, if the accelerator pedal position is great and it is considered that the driver requests great acceleration, the actuated amount of the air amount regulating mechanism, that is, an intake air amount, is suppressed at a late stage, thereby making smaller a degree of suppression of the output of the internal combustion engine. Accordingly, acceleration performance can be ensured.

Further preferably, the operation unit restricts magnitude of the threshold value.

According to the present invention, magnitude of the threshold value is restricted. Thus, such a condition that the threshold value becomes excessively large can be suppressed. Therefore, for example, even if the accelerator pedal position is great and it is considered that the driver requests great acceleration, such a condition that the shock that could occur when the direction of transmission of the torque is reversed becomes excessively great can be suppressed.

Further preferably, the operation unit changes the threshold value in accordance with not only the accelerator pedal position but also at least one of output shaft revolution of a fluid coupling connected to the internal combustion engine and a transmission ratio of a transmission connected to the internal combustion engine with the fluid coupling being interposed.

According to the present invention, the threshold value is changed in accordance with not only the accelerator pedal position but also the output shaft revolution of the fluid coupling connected to the internal combustion engine and the transmission ratio of the transmission connected to the internal combustion engine with the fluid coupling being interposed. The threshold value in accordance with a running state of the vehicle can thus be obtained. Therefore, the actuated amount of the air amount regulating mechanism can be suppressed at timing appropriate to the running state of the vehicle.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter with reference to the drawings. In the description below, the same elements have the same reference characters allotted. Their label and function are also identical. Therefore, detailed description thereof will not be repeated.

First Embodiment

Figure 1:
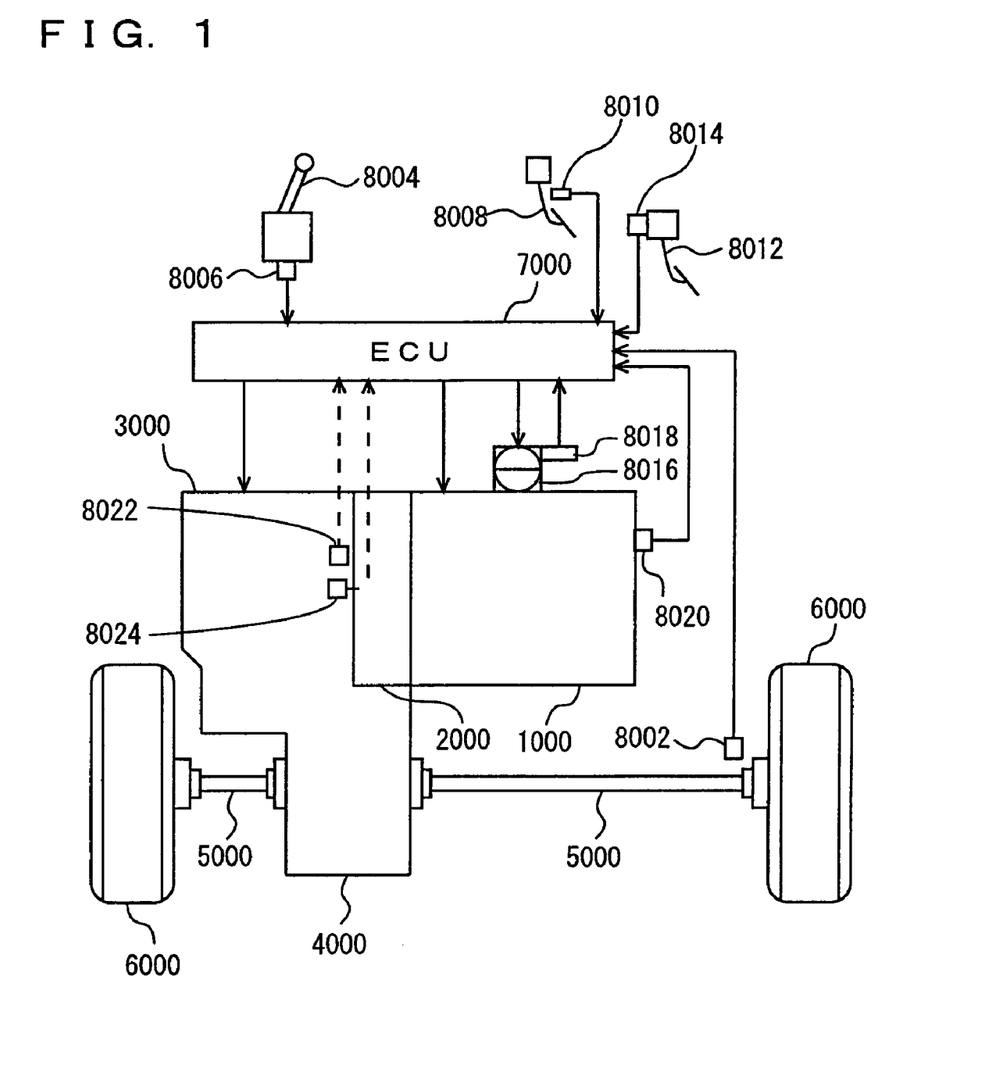
FIG. 1 is a schematic configuration diagram showing a vehicle equipped with an ECU serving as a control device according to the first embodiment of the present invention.

A vehicle equipped with a control device according to the first embodiment of the present invention will be described with reference to FIG. 1. The vehicle is an FF (Front engine Front drive) vehicle. It is noted that the vehicle is not limited to an FF vehicle.

The vehicle includes an engine 1000, a torque converter 2000, an automatic transmission 3000, a differential gear 4000, a drive shaft 5000, a front wheel 6000, and an ECU (Electronic Control Unit) 7000.

Engine 1000 is an internal combustion engine that burns a mixture consisting of fuel injected from an injector (not shown) and air, inside a combustion chamber of a cylinder. A piston in the cylinder is pushed down by the combustion, whereby a crankshaft is rotated. An amount of fuel injected from the injector is determined in accordance with an amount of air sensed by an air flowmeter (not shown) such that a desired air-fuel ratio (for example, stoichiometric air-fuel ratio) is attained.

Automatic transmission 3000 is coupled to engine 1000 with torque converter 2000 being interposed. Therefore, output shaft revolution of torque converter 2000 (turbine speed NT) is equal to an input shaft revolution of automatic transmission 3000.

Automatic transmission 3000 converts the revolution speed of the crankshaft to a desired revolution speed for speed change by implementing a desired gear. Instead of the automatic transmission implementing the gear, a CVT (Continuously Variable Transmission) that continuously varies a transmission ratio may be mounted. Alternatively, an automatic transmission including a constant mesh gear and carrying out transmission by means of a hydraulic actuator may be mounted.

An output gear of automatic transmission 3000 meshes with differential gear 4000. Driveshaft 5000 is coupled to differential gear 4000 by spline-fitting. Motive power is transmitted to left and right front wheels 6000 via driveshaft 5000.

A vehicle speed sensor 8002, a position switch 8006 of a shift lever 8004, an accelerator pedal position sensor 8010 of an accelerator pedal 8008, a stroke sensor 8014 of a brake pedal 8012, a throttle position sensor 8018 of an electronic throttle valve 8016, an engine speed sensor 8020, an input shaft speed sensor 8022, and an output shaft speed sensor 8024 are connected to ECU 7000 via a harness and the like.

Vehicle speed sensor 8002 senses the vehicle speed from the revolution of drive shaft 5000, and transmits a signal representing the sensed result to ECU 7000. The position of shift lever 8004 is sensed by position switch 8006, and a signal representing the sensed result is transmitted to ECU 7000. A gear of automatic transmission 3000 is automatically implemented corresponding to the position of shift lever 8004. Additionally, the driver may operate to select a manual shift mode in which the driver can select a gear arbitrarily.

Accelerator pedal position sensor 8010 senses the position of accelerator pedal 8008, and transmits a signal representing the sensed result to ECU 7000. Stroke sensor 8014 senses the stroke level of brake pedal 8012, and transmits a signal representing the sensed result to ECU 7000.

Throttle position sensor 8018 senses the position of electronic throttle valve 8016 of which position is adjusted by the actuator, and transmits a signal representing the sensed result to ECU 7000. Electronic throttle valve 8016 regulates the amount of air (output of engine 1000) suctioned in engine 1000. The position of electronic throttle valve 8016 (throttle position) is controlled in accordance with the accelerator pedal position. As the throttle position is higher, the amount of air suctioned in engine 1000 is greater. Alternatively, the amount of air may be regulated in accordance with a lift amount or an angle of action of an intake valve (not shown) provided in a cylinder. Here, the amount of air may be greater as the lift amount or the angle of action is greater.

Engine speed sensor 8020 senses the speed of the output shaft (crankshaft) of engine 1000, and transmits a signal representing the sensed result to ECU 7000. Input shaft speed sensor 8022 senses input shaft revolution NI (turbine speed NT) of automatic transmission 3000, and transmits a signal representing the sensed result to ECU 7000. Output shaft speed sensor 8024 senses output shaft revolution NO of automatic transmission 3000, and transmits a signal representing the sensed result to ECU 7000.

ECU 7000 controls equipment such that the vehicle is in a desired running state, based on signals sent from vehicle speed sensor 8002, position switch 8006, accelerator pedal position sensor 8010, stroke sensor 8014, throttle position sensor 8018, engine speed sensor 8020, input shaft speed sensor 8022, output shaft speed sensor 8024, and the like as well as on a map and a program stored in an ROM (Read Only Memory).

In the present embodiment, ECU 7000 controls automatic transmission 3000 such that any gear out of first to sixth gears is implemented, if D (drive) range is selected as the shift range of automatic transmission 3000 by setting shift lever 8004 to a D (drive) position. Any gear out of the first to sixth gears is implemented so that automatic transmission 3000 can transmit drive force to front wheel 6000. The gear to be implemented is determined based on a shift map prepared in advance using the vehicle speed and the accelerator pedal position as parameters. It is noted that the number of gears to be implemented is not limited to "6".

Figure 2:
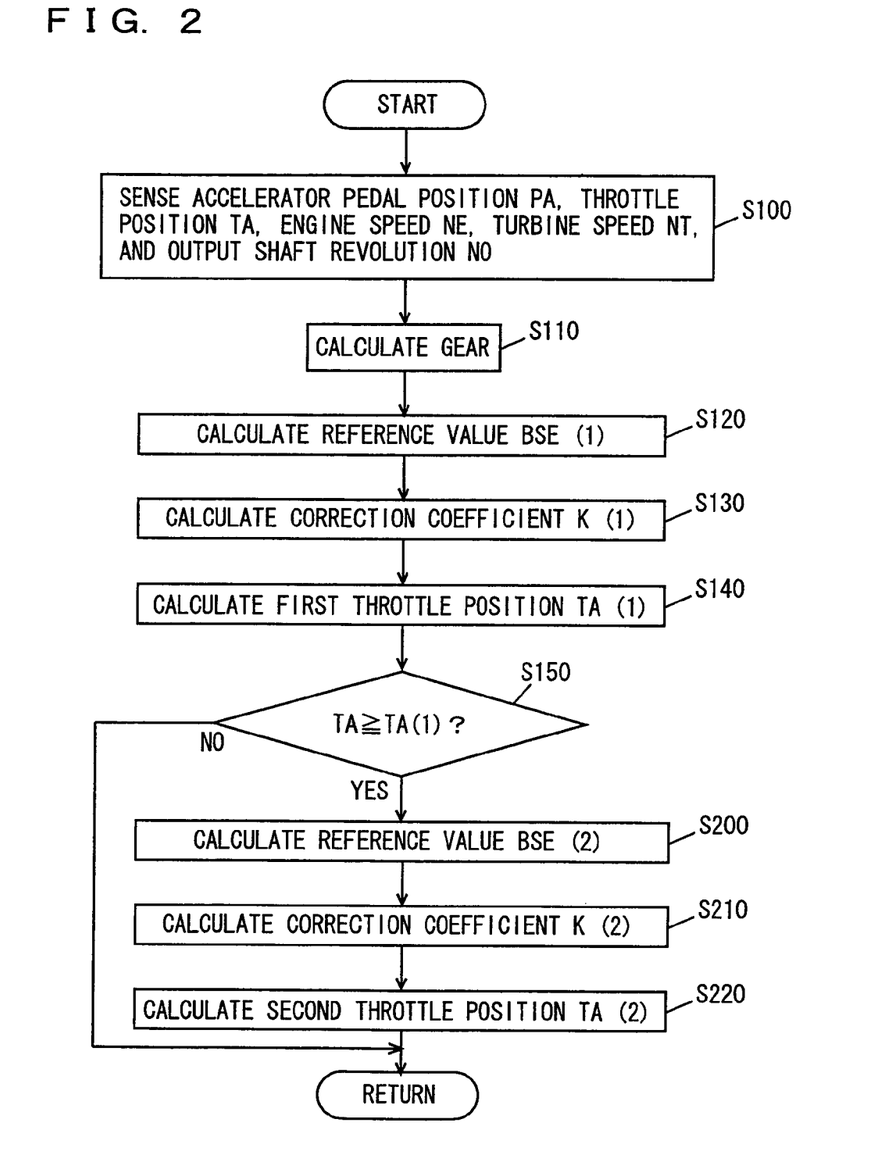
FIG. 2 is a first flowchart showing a control configuration of a program executed by the ECU serving as the control device according to the first embodiment of the present invention.

A control configuration of a first program executed by ECU 7000 serving as the control device according to the present embodiment will be described with reference to FIG. 2. It is noted that the program described below is repeatedly executed in predetermined cycles.

In step (hereinafter, step is abbreviated as S) 100, ECU 7000 senses accelerator pedal position PA, throttle position TA, engine speed NE, turbine speed NT (input shaft revolution NI of automatic transmission 3000), and output shaft revolution NO of automatic transmission 3000, based on signals transmitted from accelerator pedal position sensor 8010, throttle position sensor 8018, engine speed sensor 8020, input shaft speed sensor 8022, and output shaft speed sensor 8024.

In S110, ECU 7000 calculates a current gear (transmission ratio) of automatic transmission 3000, based on a ratio between turbine speed NT and output shaft revolution NO of automatic transmission 3000.

In S120, ECU 7000 calculates a reference value BSE (1) of a first throttle position TA (1), with the map defined in advance for each gear using turbine speed NT as a parameter. Reference value BSE (1) of first throttle position TA (1) is set such that the throttle position is higher as turbine speed NT is greater.

In S130, ECU 7000 calculates a correction coefficient K (1) for correcting reference value BSE (1) of first throttle position TA (1), with the map defined in advance for each gear using accelerator pedal position PA a parameter. Correction coefficient K (1) is set to a value that is greater as accelerator pedal position PA is greater.

In S140, ECU 7000 calculates first throttle position TA (1), using the equation first throttle position TA (1)=reference value BSE (1)×correction coefficient K (1).

In S150, ECU 7000 determines whether current throttle position TA is equal to or higher than first throttle position TA (1). If current throttle position TA is equal to or higher than first throttle position TA (1) (YES in S150), the process proceeds to S200. Otherwise (NO in S150), the process ends.

In S200, ECU 7000 calculates a reference value BSE (2) of a second throttle position TA (2), with the map defined in advance for each gear using turbine speed NT as a parameter. Reference value BSE (2) of second throttle position TA (2) is set such that the throttle position is higher as turbine speed NT is greater. In addition, reference value BSE (2) of second throttle position TA (2) is set such that the throttle position higher than that in the case of reference value BSE (1) of first throttle position TA (1) is set.

In S210, ECU 7000 calculates a correction coefficient K (2) for correcting reference value BSE (2) of second throttle position TA (2), with the map defined in advance for each gear using accelerator pedal position PA a parameter. Correction coefficient K (2) is set to a value that is greater as accelerator pedal position PA is greater.

In S220, ECU 7000 calculates second throttle position TA (2), using the equation second throttle position TA (2)=reference value BSE (2)×correction coefficient K (2).

Figure 3:
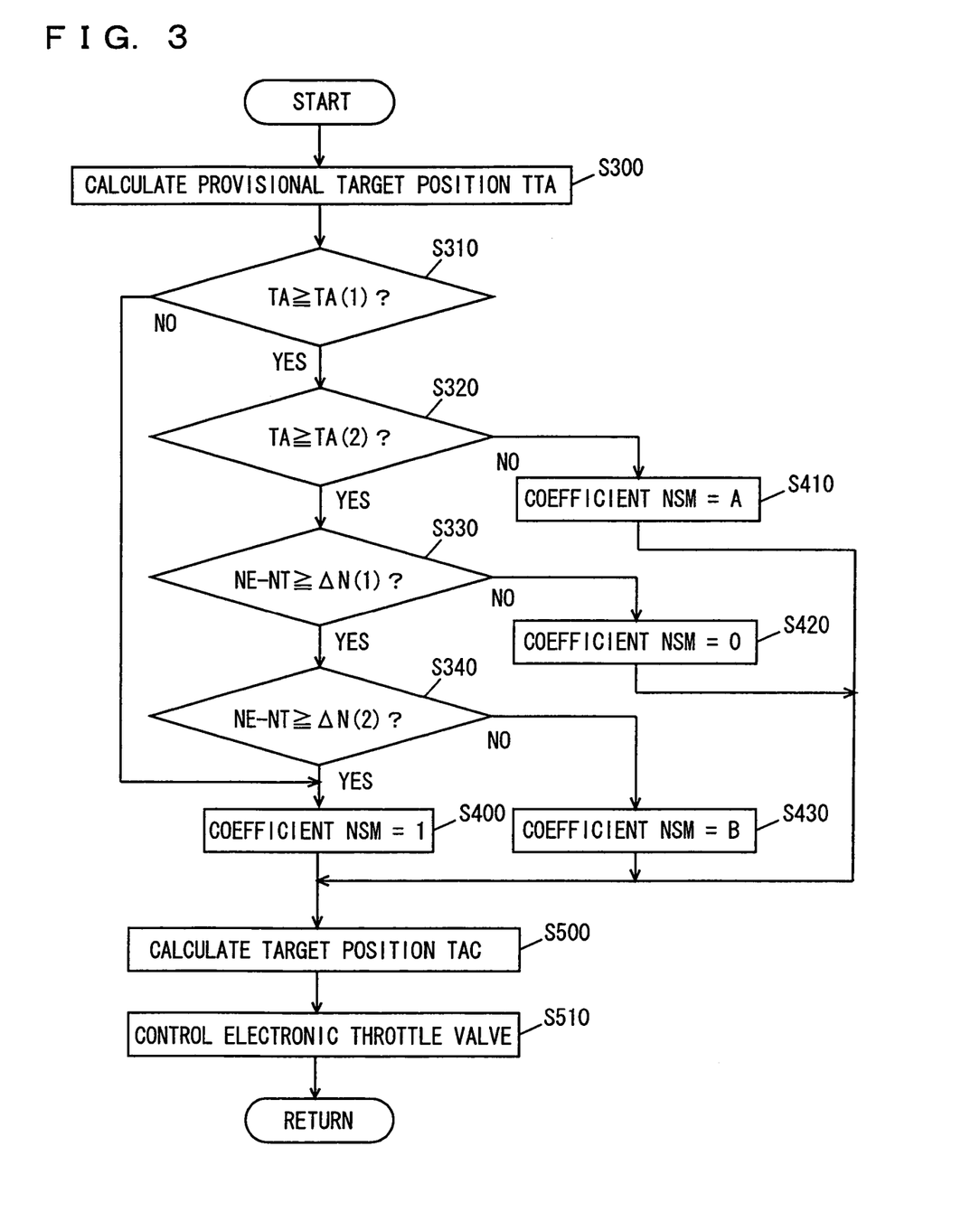
FIG. 3 is a second flowchart showing a control configuration of a program executed by the ECU serving as the control device according to the first embodiment of the present invention.

A control configuration of a second program executed by ECU 7000 serving as the control device according to the present embodiment will be described with reference to FIG. 3. It is noted that the program described below is repeatedly executed in predetermined cycles.

In S300, ECU 7000 calculates a provisional target position TTA, with the map defined in advance using accelerator pedal position PA a parameter. In S310, ECU 7000 determines whether current throttle position TA is equal to or higher than first throttle position TA (1). If throttle position TA is equal to or higher than first throttle position TA (1) (YES in S310), the process proceeds to S320. Otherwise (NO in S310), the process proceeds to S400.

In S320, ECU 7000 determines whether throttle position TA is equal to or higher than second throttle position TA (2). If throttle position TA is equal to or higher than second throttle position TA (2) (YES in S320), the process proceeds to S330. Otherwise (NO in S320), the process proceeds to S410.

In S330, ECU 7000 determines whether difference between engine speed NE and turbine speed NT (NE−NT) is equal to or larger than a predetermined value ΔN (1). Namely, ECU 7000 determines whether engine speed NE is greater than turbine speed NT by ΔN (1) or more. It is noted that ΔN (1)>0.

If difference between engine speed NE and turbine speed NT (NE−NT) is equal to or larger than predetermined value ΔN (1) (YES in S330), the process proceeds to S340. Otherwise (NO in S330), the process proceeds to S420.

In S340, ECU 7000 determines whether difference in speed between engine speed NE and turbine speed NT (NE−NT) is equal to or larger than a predetermined value ΔN (2). Namely, ECU 7000 determines whether engine speed NE is greater than turbine speed NT by ΔN (2) or more. It is noted that ΔN (2)>ΔN (1).

If difference between engine speed NE and turbine speed NT (NE−NT) is equal to or larger than predetermined value ΔN (2) (YES in S340), the process proceeds to S400. Otherwise (NO in S340), the process proceeds to S430.

In S400, ECU 7000 sets a coefficient NSM, used in S500 which will be described later, to "1". In S410, ECU 7000 sets coefficient NSM to "A" (0<A<1). In S420, ECU 7000 sets coefficient NSM to "0". In S430, ECU 7000 sets coefficient NSM to "B" (0<B<1).

In S500, ECU 7000 calculates a target position TAC based on provisional target position TTA, using the equation TAC (N)=TAC (N−1)+(TTA (N)−TAC (N−1))×NSM. Here, TAC (N) represents the target position calculated this time. TAC (N−1) represents the target position calculated previously. TTA (N) represents current provisional target position TTA.

In S510, ECU 7000 controls electronic throttle valve 8016 such that the throttle position is set to target position TAC calculated this time.

An operation of ECU 7000 serving as the control device according to the present embodiment based on the configuration and the flowchart as above will now be described.

Figure 4:
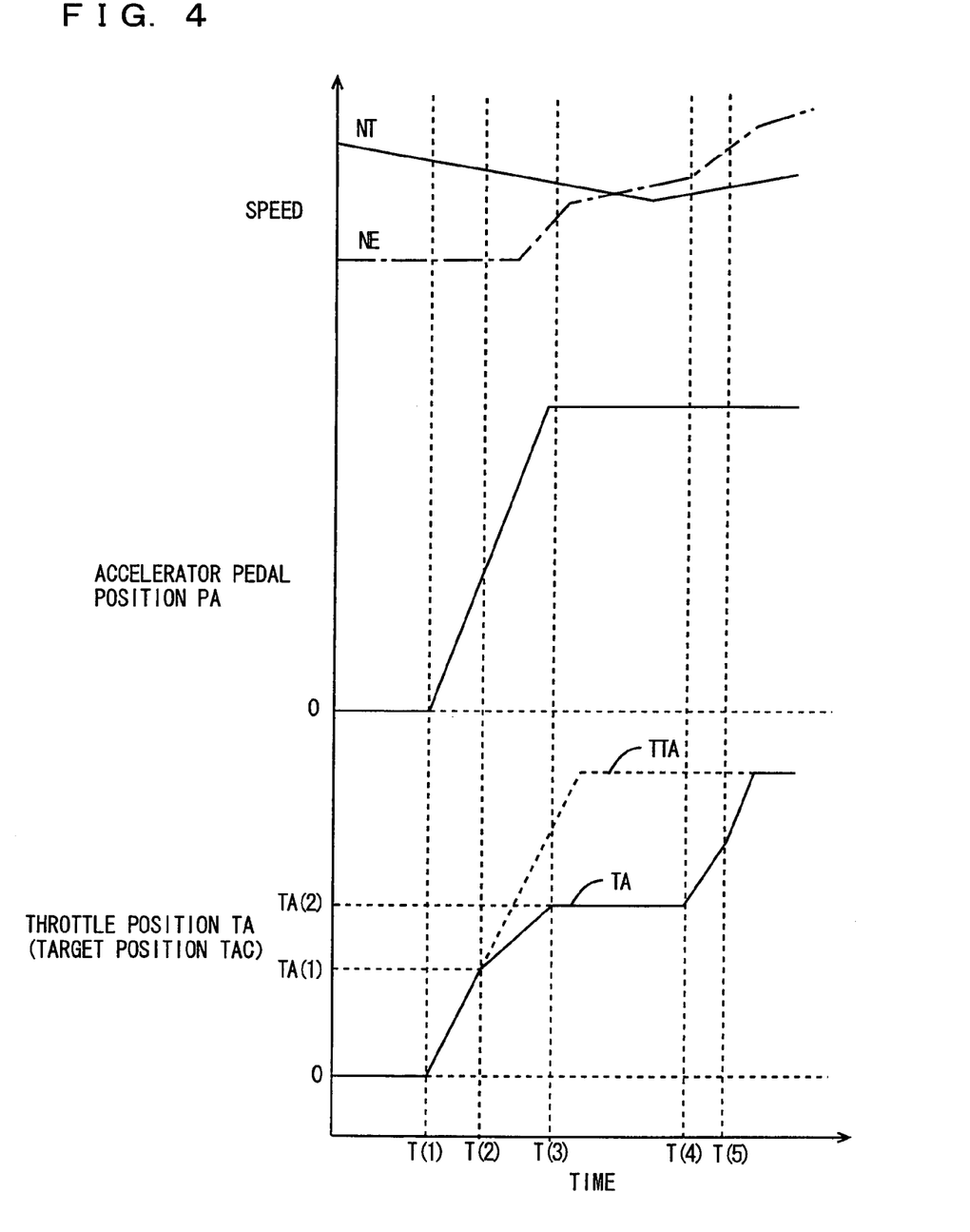
FIG. 4 is a first timing chart showing transition of a throttle position.

Currently, the accelerator pedal position is set to "0", and the vehicle is in a deceleration state. Therefore, as shown in FIG. 4 at time T (1), it is assumed that engine speed NE is lower than turbine speed NT.

In this state, accelerator pedal position PA, throttle position TA, engine speed NE, turbine speed NT, and output shaft revolution NO of automatic transmission 3000 are sensed (S100). Current gear (transmission ratio) of automatic transmission 3000 is calculated based on a ratio between turbine speed NT and output shaft revolution NO (S110).

In addition, reference value BSE (1) of first throttle position TA (1) is calculated with the map defined in advance for each gear using turbine speed NT as a parameter (S120). Then, correction coefficient K (1) for correcting reference value BSE (1) of first throttle position TA (1) is calculated with the map defined in advance for each gear using accelerator pedal position PA a parameter (S130). First throttle position TA (1) is calculated as a product of the reference value and the correction coefficient (S140).

If throttle position TA is lower than first throttle position TA (1) (NO in S310), coefficient NSM is set to "1" (S400). Therefore, relation of TAC (N)=TTA (N) is satisfied, and provisional target position TTA calculated in accordance with accelerator pedal position PA (S300) is used as target position TAC as it is. Electronic throttle valve 8016 is controlled such that throttle position TA is set to target position TAC.

Therefore, throttle position TA is made higher over time until throttle position TA reaches first throttle position TA (1). Thus, electronic throttle valve 8016 is driven relatively rapidly, based on provisional target position TTA. The intake air amount is increased and engine speed NE increases after the change in throttle position TA.

When throttle position TA reaches first throttle position TA (1) at time T (2) in FIG. 4 (YES in S150, YES in S310), reference value BSE (2) of second throttle position TA (2) is calculated (S200).

In addition, correction coefficient K (2) for correcting reference value BSE (2) of second throttle position TA (2) is calculated (S210), and second throttle position TA (2) is calculated as a product of reference value BSE (2) and correction coefficient K (2) (S220).

Here, as shown in FIG. 4 at time T (2), throttle position TA is equal to or higher than first throttle position TA (1) (YES in S310) and lower than second throttle position TA (2) (NO in S320). Therefore, coefficient NSM is set to "A" (S410). Accordingly, relation of TAC (N)=TAC (N−1)+(TTA (N)−TAC (N−1))×A is satisfied, and target position TAC lower than provisional target position TTA is set. Electronic throttle valve 8016 is controlled such that target position TAC is set (S510).

Namely, when provisional target position TTA is equal to or higher than first throttle position TA (1), electronic throttle valve 8016 is controlled such that target position TAC lower than provisional target position TTA is set.

Therefore, at the throttle position equal to or higher than first throttle position TA (1), throttle position TA is gradually made higher until second throttle position TA (2) is reached. The intake air amount increases and engine speed NE increases after the change in throttle position TA.

When throttle position TA reaches second throttle position TA (2) at time T (3) in FIG. 4 (YES in S320), whether difference between engine speed NE and turbine speed NT (NE−NT) is equal to or larger than predetermined value ΔN (1) (S330).

Here, if difference between engine speed NE and turbine speed NT (NE−NT) is smaller than ΔN (1) (NO in S330), coefficient NSM is set to "0" (S420).

Therefore, relation of TAC (N)=TAC (N−1) is satisfied, and target position TAC is maintained at second throttle position TA (2). Electronic throttle valve 8016 is controlled such that target position TAC is attained (S510). Therefore, engine speed NE gradually increases until engine speed NE is higher than turbine speed NT by ΔN (1) or more.

Thus, engine speed NE can gradually be increased when relation in magnitude between engine speed NE and turbine speed NT is reversed. Accordingly, the shock that could occur when the direction of transmission of the torque is reversed can be suppressed.

Thereafter, at time T (4) shown in FIG. 4, if difference between engine speed NE and turbine speed NT (NE−NT) is equal to or greater than ΔN (1) (YES in S330) and smaller than ΔN (2) (NO in S340), coefficient NSM is set to "B" (S430).

Therefore, relation of TAC (N)=TAC (N−1)+(TTA (N)−TAC (N−1))×B is satisfied, and target position TAC is gradually made higher such that the throttle position lower than provisional target position TTA is set. Electronic throttle valve 8016 is controlled such that target position TAC is attained (S510). Namely, control for maintaining throttle position TA at second throttle position TA (2) ends.

In addition, at time T (5) shown in FIG. 4, if difference between engine speed NE and turbine speed NT (NE−NT) is equal to or greater than ΔN (2) (YES in S340), coefficient NSM is set to "1" (S400).

Therefore, relation of TAC (N)=TTA (N) is satisfied, and provisional target position TTA is set as target position TAC as it is. Electronic throttle valve 8016 is controlled such that the throttle position is set to target position TAC (S510). Therefore, throttle position TA can rapidly be changed to the position in accordance with accelerator pedal position PA.

Here, as described above, first throttle position TA (1) and second throttle position TA (2) are calculated as a product of correction coefficient K and reference value BSE, of which value is greater as accelerator pedal position PA is greater.

Figure 5:
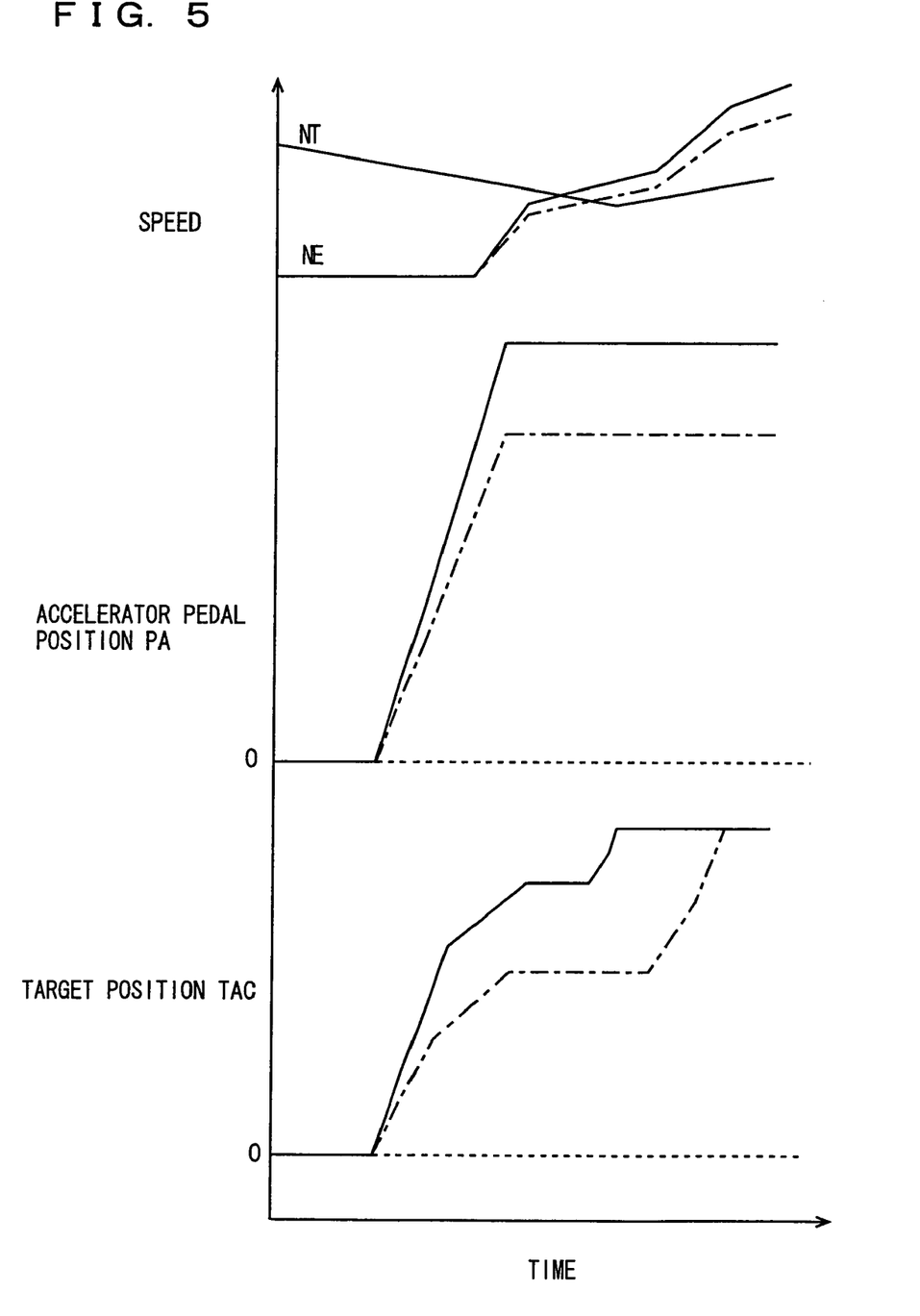
FIG. 5 is a second timing chart showing transition of a throttle position.

Therefore, in a state where accelerator pedal position PA is great (solid line in FIG. 5) as shown in FIG. 5, first throttle position TA (1) and second throttle position TA (2) are higher than in a state where accelerator pedal position PA is small (single dotted line in FIG. 5). Accordingly, in the state where accelerator pedal position PA is great (solid line in FIG. 5), target position TAC higher than in the state where accelerator pedal position PA is small (single dotted line in FIG. 5) is calculated.

Therefore, if accelerator pedal position PA is great and it is considered that the driver requests greater acceleration, the vehicle can accelerate as requested by the driver. Here, though there is possibility of occurrence of slight shock at the time when the direction of transmission of the torque is reversed, the driver would anticipate (expect) such occurrence of shock. Therefore, it cannot be said that drivability deteriorates.

In contrast, in the state where accelerator pedal position PA is small, target position TAC lower than in the state where accelerator pedal position PA is great is calculated. Therefore, if accelerator pedal position PA is small and it is not considered that the driver requests great acceleration, priority is placed on suppression of shock, rather than on acceleration performance.

As described above, according to the ECU serving as the control device in the present embodiment, when throttle position TA is equal to or higher than first throttle position TA (1), target position TAC lower than provisional target position TTA set in accordance with accelerator pedal position PA is set, and throttle position TA is gradually made higher. When throttle position TA reaches second throttle position TA (2), the throttle position is maintained at second throttle position TA (2) until the engine speed is greater than the turbine speed by ΔN (1) or more. Higher first throttle position TA (1) and second throttle position TA (2) are set as accelerator pedal position PA is greater. Thus, if accelerator pedal position PA is great and it is considered that the driver requests great acceleration, throttle position TA can be suppressed at a late stage. Therefore, the vehicle can accelerate as requested by the driver, by making throttle position TA higher so as to increase output of the engine. On the other hand, if accelerator pedal position PA is small and it is not considered that the driver requests great acceleration, throttle position TA can be suppressed at an early stage. Therefore, the shock that could occur when the direction of transmission of the torque is reversed as a result of reversal in relation in magnitude between the engine speed and the turbine speed can be suppressed by making throttle position TA lower so as to suppress the output of the engine.

Second Embodiment

The second embodiment of the present invention will be described hereinafter. The present embodiment is different from the first embodiment described previously in that there is upper limit in each of first throttle position TA (1) and second throttle position TA (2). The present embodiment is otherwise the same as the first embodiment described previously and the function is also the same. Therefore, detailed description will not be repeated.

Figure 6:
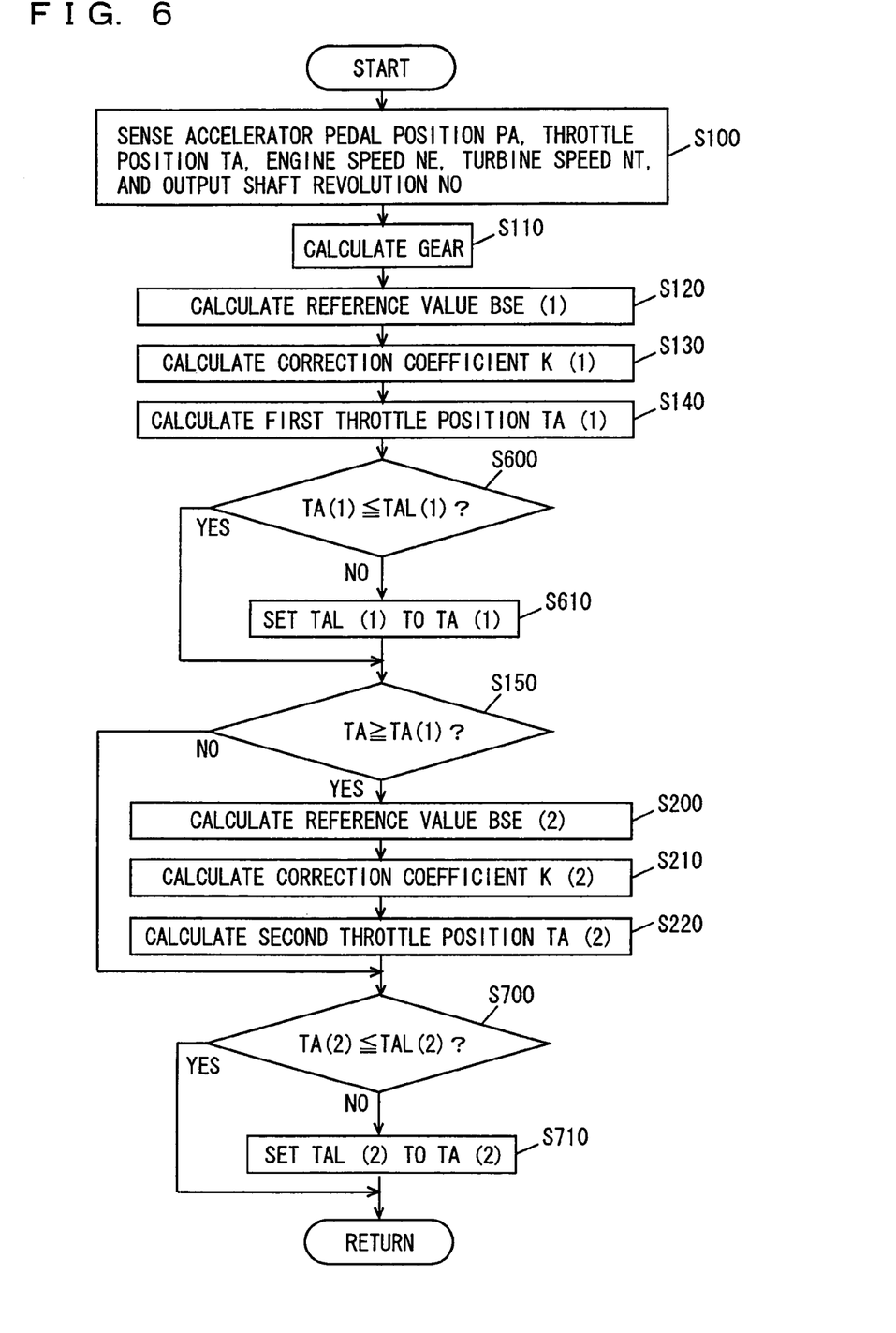
FIG. 6 is a flowchart showing a control configuration of a program executed by an ECU serving as a control device according to the second embodiment of the present invention.

A control configuration of a program executed by ECU 7000 serving as the control device according to the present embodiment will be described with reference to FIG. 6. It is noted that the processing the same as that in the program in the first embodiment described previously is given the same step number. The function is also the same. Therefore, detailed description will not be repeated. The program described below is repeatedly executed in predetermined cycles.

In S600, ECU 7000 determines whether calculated first throttle position TA (1) is equal to or lower than a first upper limit TAL (1). If calculated first throttle position TA (1) is equal to or lower than first upper limit TAL (1) (YES in S600), the process proceeds to S150. Otherwise (NO in S600), the process proceeds to S610.

In S610, ECU 7000 sets first upper limit TAL (1) as first throttle position TA (1). Thereafter, the process proceeds to S150.

In S700, ECU 7000 determines whether calculated second throttle position TA (2) is equal to or lower than a second upper limit TAL (2). If calculated second throttle position TA (2) is equal to or lower than second upper limit TAL (2) (YES in S700), the process ends. Otherwise (NO in S700), the process proceeds to S710.

In S710, ECU 7000 sets second upper limit TAL (2) as second throttle position TA (2). Thereafter, the process ends.

Thus, such a condition that first throttle position TA (1) and second throttle position TA (2) become excessively high can be suppressed. Therefore, occurrence of shock greater than expected by the driver, attributed to excessively high throttle position TA when the direction of transmission of the torque is reversed at the time of acceleration, can be suppressed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device of an air amount regulating mechanism regulating an amount of air suctioned in an internal combustion engine so that the amount of air is greater as an actuated amount is greater, comprising an operation unit;
    said operation unit setting a first actuated amount of said air amount regulating mechanism based on an accelerator pedal position,
    setting a second actuated amount smaller than said first actuated amount,
    controlling said air amount regulating mechanism such that the actuated amount of said air amount regulating mechanism attains said first actuated amount,
    controlling said air amount regulating mechanism, in a region where said first actuated amount is greater than a threshold value, such that the actuated amount of said air amount regulating mechanism attains said second actuated amount, and
    changing said threshold value based on the accelerator pedal position.

2. The control device of an air amount regulating mechanism according to claim 1, wherein
    said operation unit changes said threshold value to a value that is smaller as the accelerator pedal position is smaller.

3. The control device of an air amount regulating mechanism according to claim 1, wherein
    said operation unit changes said threshold value to a value that is greater as the accelerator pedal position is greater.

4. The control device of an air amount regulating mechanism according to claim 1, wherein
said operation unit restricts magnitude of said threshold value.

5. The control device of an air amount regulating mechanism according to claim 1, wherein
said operation unit changes said threshold value in accordance with not only the accelerator pedal position but also at least one of output shaft revolution of a fluid coupling connected to said internal combustion engine and a transmission ratio of a transmission connected to said internal combustion engine with said fluid coupling being interposed.

6. A method of controlling an air amount regulating mechanism regulating an amount of air suctioned in an internal combustion engine so that the amount of air is greater as an actuated amount is greater, comprising the steps of:
setting a first actuated amount of said air amount regulating mechanism based on an accelerator pedal position;
setting a second actuated amount smaller than said first actuated amount;
controlling said air amount regulating mechanism such that the actuated amount of said air amount regulating mechanism attains said first actuated amount;
controlling said air amount regulating mechanism, in a region where said first actuated amount is greater than a threshold value, such that the actuated amount of said air amount regulating mechanism attains said second actuated amount; and
changing said threshold value based on the accelerator pedal position.

7. The method of controlling an air amount regulating mechanism according to claim 6, wherein
said step of changing said threshold value includes the step of changing said threshold value to a value that is smaller as the accelerator pedal position is smaller.

8. The method of controlling an air amount regulating mechanism according to claim 6, wherein
said step of changing said threshold value includes the step of changing said threshold value to a value that is greater as the accelerator pedal position is greater.

9. The method of controlling an air amount regulating mechanism according to claim 6, further comprising the step of restricting magnitude of said threshold value.

10. The method of controlling an air amount regulating mechanism according to claim 6, wherein
said step of changing said threshold value includes the step of changing said threshold value in accordance with not only the accelerator pedal position but also at least one of output shaft revolution of a fluid coupling connected to said internal combustion engine and a transmission ratio of a transmission connected to said internal combustion engine with said fluid coupling being interposed.

11. A control device of an air amount regulating mechanism regulating an amount of air suctioned in an internal combustion engine so that the amount of air is greater as an actuated amount is greater, comprising:
first setting means for setting a first actuated amount of said air amount regulating mechanism based on an accelerator pedal position;
second setting means for setting a second actuated amount smaller than said first actuated amount;
first control means for controlling said air amount regulating mechanism such that the actuated amount of said air amount regulating mechanism attains said first actuated amount;
second control means for controlling said air amount regulating mechanism, in a region where said first actuated amount is greater than a threshold value, such that the actuated amount of said air amount regulating mechanism attains said second actuated amount; and
changing means for changing said threshold value based on the accelerator pedal position.

12. The control device of an air amount regulating mechanism according to claim 11, wherein
said changing means includes means for changing said threshold value to a value that is smaller as the accelerator pedal position is smaller.

13. The control device of an air amount regulating mechanism according to claim 11, wherein
said changing means includes means for changing said threshold value to a value that is greater as the accelerator pedal position is greater.

14. The control device of an air amount regulating mechanism according to claim 11, further comprising restriction means for restricting magnitude of said threshold value.

15. The control device of an air amount regulating mechanism according to claim 11, wherein
said changing means includes means for changing said threshold value in accordance with not only the accelerator pedal position but also at least one of output shaft revolution of a fluid coupling connected to said internal combustion engine and a transmission ratio of a transmission connected to said internal combustion engine with said fluid coupling being interposed.

* * * * *